United States Patent
Fujimoto

(10) Patent No.: US 8,540,331 B2
(45) Date of Patent: Sep. 24, 2013

(54) PRINTING APPARATUS AND PRINTING METHOD

(75) Inventor: Kazushi Fujimoto, Kawaguchi (JP)

(73) Assignee: Canon Kabushiki Kaisha, Tokyo (JP)

(*) Notice: Subject to any disclaimer, the term of this patent is extended or adjusted under 35 U.S.C. 154(b) by 1097 days.

(21) Appl. No.: 12/324,460

(22) Filed: Nov. 26, 2008

(65) Prior Publication Data
US 2009/0141293 A1 Jun. 4, 2009

(30) Foreign Application Priority Data
Nov. 30, 2007 (JP) ................. 2007-311480

(51) Int. Cl.
*B41J 29/38* (2006.01)
(52) U.S. Cl.
USPC ............................................. 347/12; 347/14
(58) Field of Classification Search
USPC ..................................... 347/12, 14
See application file for complete search history.

(56) References Cited

U.S. PATENT DOCUMENTS
2006/0203074 A1 9/2006 Ishizaki
2007/0146396 A1* 6/2007 Yamashita et al. ............... 347/5

FOREIGN PATENT DOCUMENTS
JP 2004-009489 1/2004
JP 2006-247905 9/2006

* cited by examiner

*Primary Examiner* — Julian Huffman
(74) *Attorney, Agent, or Firm* — Canon USA Inc IP Division

(57) ABSTRACT

This invention corrects a print position error caused by the inclination of the nozzle array of a printhead without decreasing the printing speed. To accomplish this, print data of at least one column in the print medium conveying direction is read out for a predetermined number of bits from print data stored in a first storage unit. Print data of a plurality of columns read out in the reading step is written in a second storage unit which is higher in data input/output speed than the first storage unit, and can input/output data for each bit. It is controlled to read out print data belonging to different groups from a plurality of columns of the second storage unit, edit print data for a plurality of nozzles, and print based on the edited print data.

8 Claims, 11 Drawing Sheets

F I G. 10
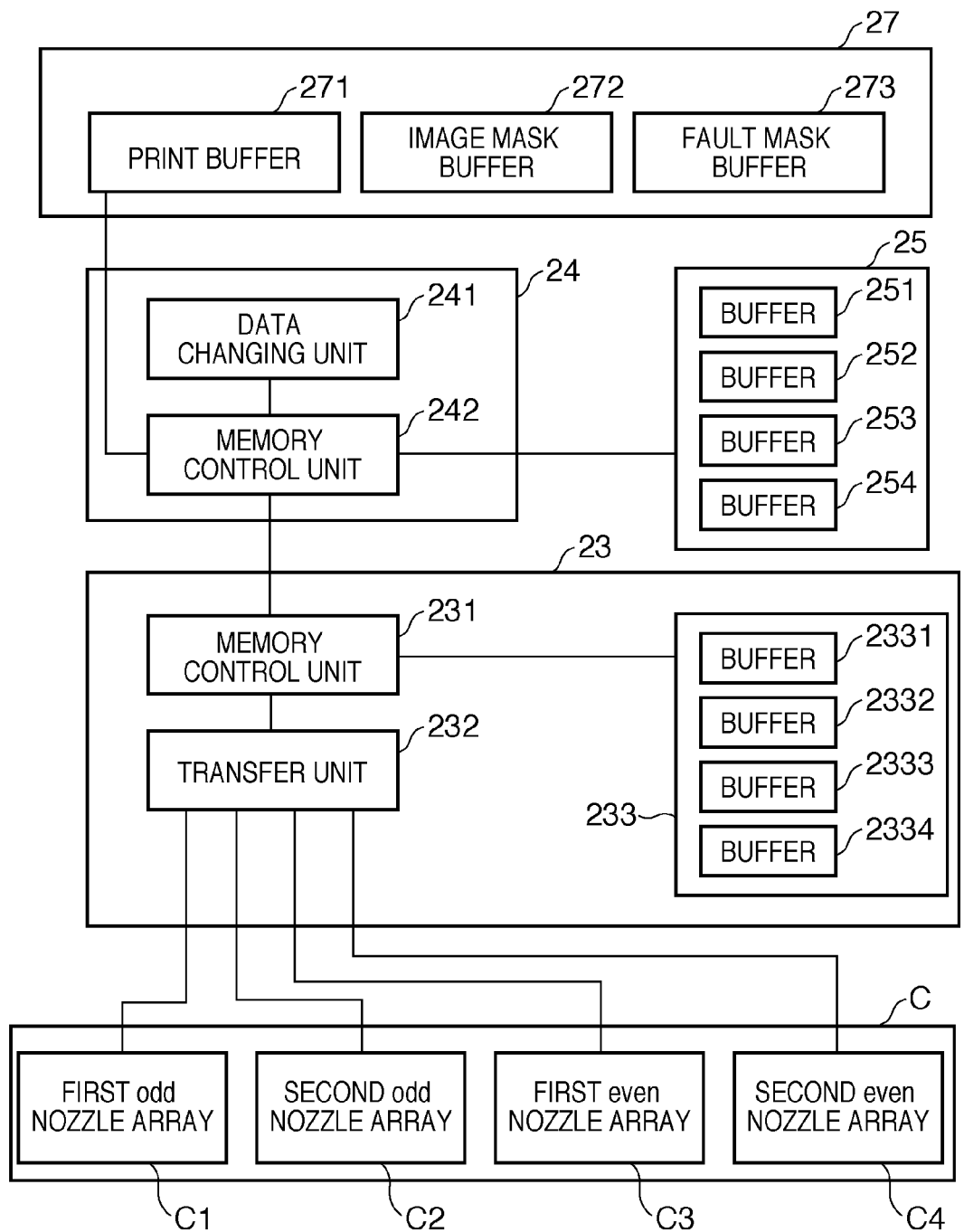

PRINTING APPARATUS AND PRINTING METHOD

BACKGROUND OF THE INVENTION

1. Field of the Invention

The present invention relates to a serial printing apparatus and printing method therefor and, more particularly, to a serial inkjet printing apparatus and printing method therefor.

2. Description of the Related Art

These days, a printing apparatus which prints on a sheet-like print medium such as paper or film is widely used as a printing apparatus which outputs information such as a character or image for a word processor, personal computer, facsimile apparatus, and the like.

Various printing methods are known for printing apparatuses. Of these methods, an inkjet method has received a great deal of attention in recent years because it can perform non-contact printing on a print medium, facilitates color printing, and is quiet. Especially, a serial inkjet printing apparatus is very popular because it is inexpensive and can be easily downsized. The serial inkjet printing apparatus prints while a printhead, which discharges ink in accordance with a print instruction, reciprocally scans in a direction perpendicular to the print medium conveying direction.

The serial inkjet printing apparatus temporarily stores, in its internal memory, print data sequentially sent from a host apparatus such as a personal computer. The print data stored in the memory are converted into print data of a format optimum for printing corresponding to printhead characteristics. The converted print data is transferred to the printhead at a timing based on the printing resolution, and printhead position information obtained from, e.g., an encoder sensor arranged on a carriage which supports the printhead. Then, printing is executed.

A nozzle array which is formed on a printhead and discharges ink is ideally arranged without any error from a predetermined position with respect to the printing apparatus and printhead so as to be able to print at a predetermined print position. However, the nozzle array is sometimes arranged with a predetermined inclination from a predetermined position owing to an error generated when manufacturing a printhead, or a mounting error generated when mounting a printhead in a printing apparatus. As a method of correcting a print position error caused by the inclination, print data is stored in a memory so as to correct the print position error in accordance with the inclination (see, e.g., Japanese Patent Laid-Open No. 2006-247905). There is also disclosed a method of changing a print data read position so as to correct a print position error in accordance with the inclination when reading out print data from a memory (see, e.g., Japanese Patent Laid-Open No. 2004-009489).

To increase the printing speed and prolong the available time of the printhead, a divisional printing method is known. According to this method, the number of nozzle arrays of the printhead is increased. Print data of, e.g., one nozzle array are distributed to two nozzle arrays, and printed while interpolated by the two nozzle arrays.

According to the conventional method of correcting the inclination of the nozzle array of the printhead, the inclination is corrected by changing the write address of corresponding print data or the read address of corresponding print data in accordance with the inclination. In this correction method, the correction is done by performing print data write and read for print data which correspond to a predetermined number of adjacent nozzles and are written at the same address. When the number of bits of print data written at the same address and that of bits of print data whose address is to be changed for correction are different, all print data must be read out from the address at which the print data whose address is to be changed for correction is written. Then, necessary data must be extracted and concatenated. Depending on the degree of inclination of the nozzle array of the printhead, data must be read out from many addresses, decreasing the processing speed. It becomes difficult to quickly correct the inclination of the nozzle array of the printhead, decreasing the processing speed.

The following problem arises when performing divisional printing to distribute corrected print data of one nozzle array to two nozzle arrays and print while interpolating the print data by the two nozzle arrays. As for print data, and data of a mask (image mask) used to perform multipass printing, or distribute print data to two nozzle arrays and print, common data are available for two nozzle arrays. However, data of a mask (fault mask) generated by reflecting information relating to a faulty nozzle such as a discharge failure nozzle needs to be read out separately for each nozzle array because faulty nozzles are different between two nozzle arrays. The faulty nozzle is defined as a nozzle from which ink is not properly discharged. On the other hand, the discharge failure nozzle is defined as a nozzle from which ink is not absolutely discharged. Thus, data of fault masks and image masks for two nozzle arrays must be read out in addition to print data for one nozzle array. This prolongs the time taken to read out data from a memory, decreasing the printing speed.

SUMMARY OF THE INVENTION

The present invention enables realization of a printing apparatus and printing method capable of correcting a print position error caused by the inclination of the nozzle array of a printhead without decreasing the printing speed.

According to one aspect of the present invention, a printing apparatus which performs scan printing on a print medium by using a printhead having, for each color ink, a plurality of nozzle arrays in each of which a plurality of nozzles are arrayed, the apparatus includes a control unit configured to execute a speed oriented mode and an image quality oriented mode as modes of the scan printing; a print control unit configured to generate data to be transferred to the printhead, for each nozzle array, based on print data of one nozzle array, based on change data for changing data corresponding to a nozzle which does not discharge ink in the print data of the one nozzle array, and based on information relating to an inclination of a nozzle array in a reference direction; and a memory control unit configured to read out print data held in a first buffer memory outside the print control unit, and store, in a second buffer memory inside the print control unit in correspondence with a nozzle array, print data changed in accordance with the change data. In the image quality oriented mode, the print control unit reads out the change data from the first buffer memory, and generates data to be transferred to the printhead. In the speed oriented mode, the print control unit reads out the change data held in advance in the second buffer memory and generates data to be transferred to the printhead.

According to another aspect of the present invention, a printing method of performing scan printing on a print medium by using a printhead having, for each color ink, a plurality of nozzle arrays in each of which a plurality of nozzles are arrayed, the method includes setting execution of a speed oriented mode or an image quality oriented mode as a mode of the scan printing; generating, by a print control unit, data to be transferred to the printhead for each nozzle array based on print data of one nozzle array, change data for changing data corresponding to a nozzle which dose not discharge ink in the print data of the one nozzle array, and information relating to an inclination of a nozzle array in a reference direction[See claim 8]; reading out print data held in a first buffer memory outside the print control unit; and storing in a second buffer memory inside the print control unit print data changed in accordance with the change data. In the generating step, when executing the image quality oriented mode, the change data is read out from the first buffer memory to generate data to be transferred to the printhead. When executing the speed oriented mode, the change data held in advance in the second buffer memory is read out to generate data to be transferred to the printhead.

Further features of the present invention will be apparent from the following description of exemplary embodiments with reference to the attached drawings.

BRIEF DESCRIPTION OF THE DRAWINGS

FIG. 10 is a block diagram showing print data processing according to the present invention;

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

In this specification, the term "print" not only includes the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Further, the term "ink" should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Unless otherwise specified, the term "nozzle" generically means an orifice, a liquid channel communicating with it, and an element which generates energy used for ink discharge.

Figure 1:
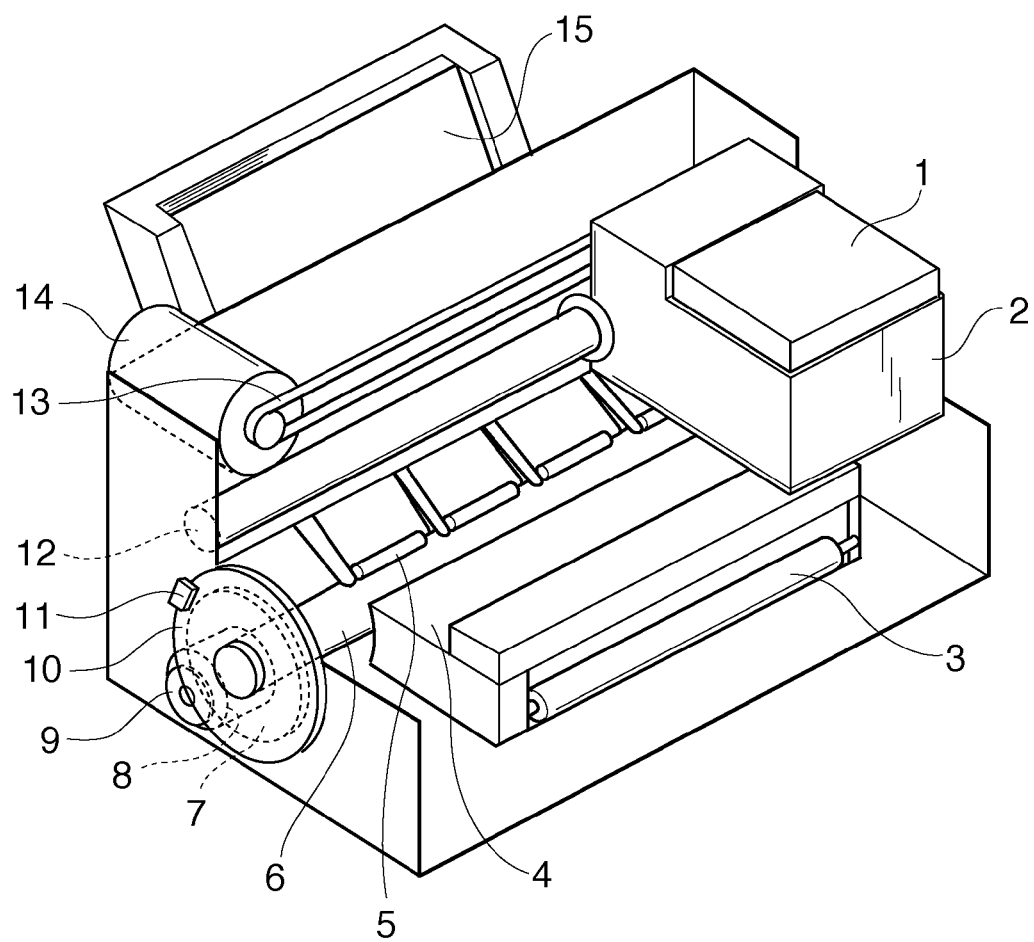
FIG. 1 is a perspective view showing the structure of the main part of a printing apparatus to which the present invention is applicable.

FIG. 1 is a perspective view showing the structure of the main part of a printing apparatus to which the present invention is applicable. In FIG. 1, a printhead 1 has a nozzle array made up of a plurality of nozzles for discharging ink. A carriage 2 supports the printhead 1, and scans it in a scanning direction perpendicular to the print medium conveying direction. A delivery roller 3 is used to convey a printed medium to outside the printing apparatus. A platen 4 is positioned below a printed surface. Paper press rollers 5 are used to press a print medium 15 such as print paper. A paper feed motor 8 drives a paper feed roller 6 via a paper feed gear 7 and a paper feed motor gear 9. An encoder film 10 rotates in synchronism with the paper feed motor 8. An encoder sensor 11 is used to detect a slit formed in the encoder film, detect the position of the paper feed motor, and generate the print timing. A shaft 12 fixes the carriage 2. A belt 13 and a motor 14 drive the carriage 2.

Figure 2:
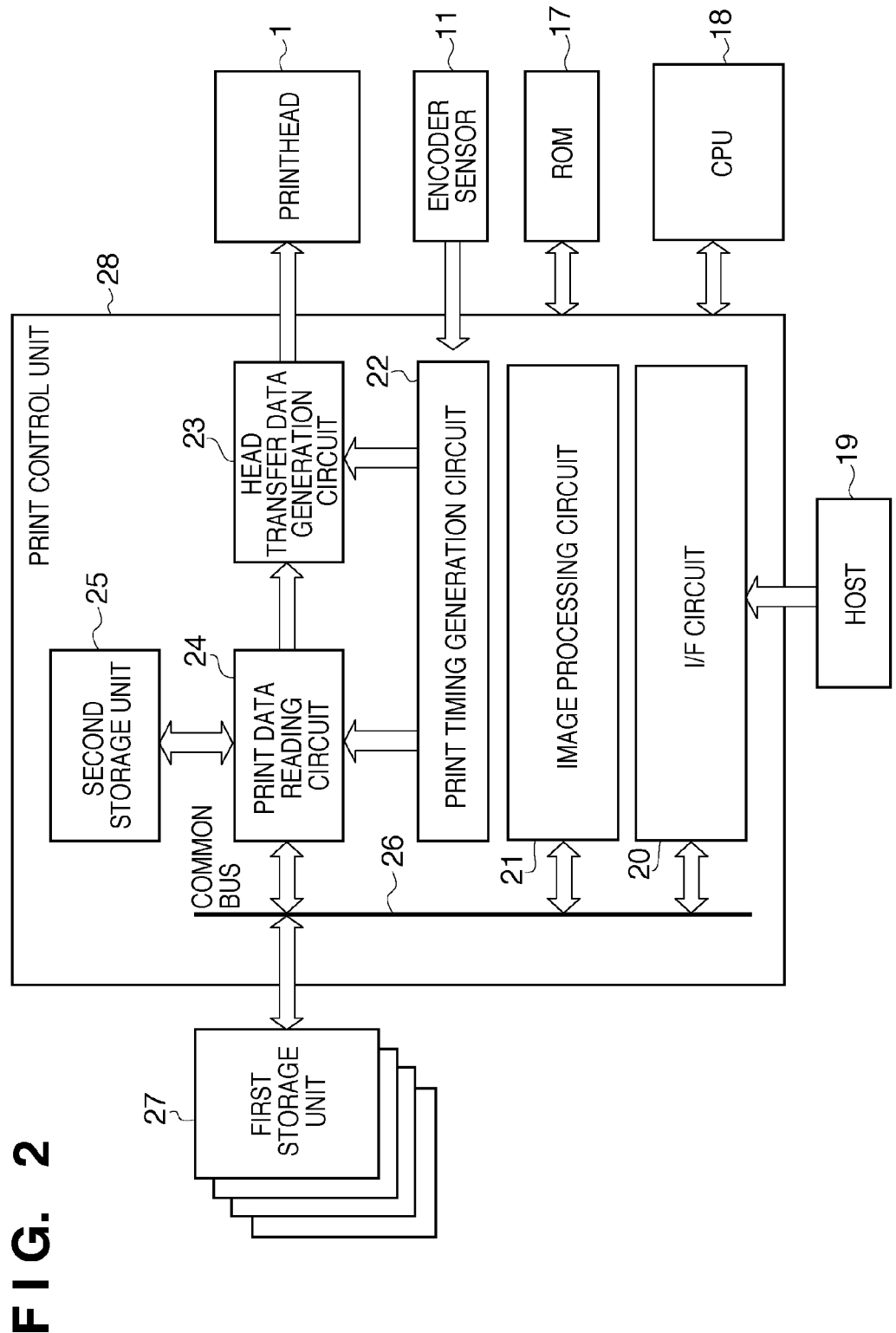
FIG. 2 is a block diagram showing the arrangement of the control part of the printing apparatus to which the present invention is applicable.

FIG. 2 is a block diagram showing the arrangement of the control part (a print control unit 28 and the like) of the printing apparatus to which the present invention is applicable. An interface (I/F) circuit 20 receives a control command and print data transmitted from a host 19. A CPU 18 analyzes the received control command, and controls the printing apparatus in accordance with the control command. The received print data is sent to an image processing unit 21 via a common bus 26, undergoes various image processes corresponding to the printing method, and is stored again via the common bus 26 in a first storage unit 27 formed from a large-capacity RAM or the like. The print control unit 28 is, e.g., an ASIC.

The first storage unit 27 is generally the first buffer memory formed from a large-capacity DRAM. The first storage unit 27 stores print data of respective printhead nozzles for at least one scanning. Further, the first storage unit 27 stores mask data made up of data of an image mask used to perform multipass printing, or distribute print data to two nozzles and print, and data of a fault mask generated by reflecting information relating to a faulty nozzle such as a discharge failure nozzle. The printing apparatus in the embodiment can detect a faulty nozzle by using an optical sensor or the like.

The CPU 18 controls the overall printing apparatus in accordance with a program stored in advance in a ROM 17 and a control command input from the host 19 via the I/F circuit 20. The ROM 17 stores a program for operating the CPU 18, various tables necessary to control the printhead, and the like.

In accordance with a print start instruction from the CPU 18, a print data reading circuit 24 reads out print data stored in the first storage unit 27 at a timing generated by a print timing generation circuit 22 from the detection value of the encoder sensor 11. Then, composition processing is performed to composite the readout print data and mask data separately read out from the first storage unit 27. The print data composited with the mask data by the composition processing is stored in a second storage unit 25. The second storage unit 25 is the second buffer memory formed from an SRAM or register higher in data input/output speed than a DRAM, and can input/output data for each bit. The print data reading circuit 24 reads out desired print data for each bit from print data stored in the second storage unit 25 in accordance with the inclination. After print data of one nozzle array is read out, it is sent to the printhead 1 via a head transfer data generation circuit 23, and printed.

Figure 4:
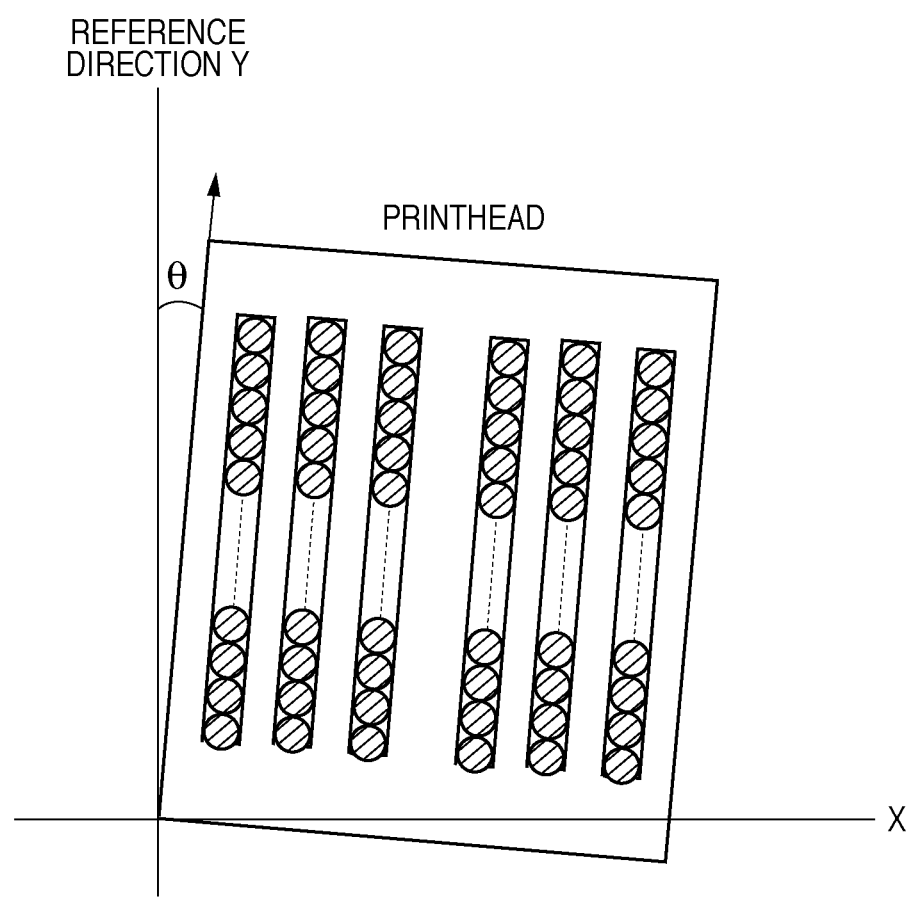
FIG. 4 is a view exemplifying a case where the printhead is mounted in the printing apparatus with an inclination θ from a reference position.

A method of correcting the inclination of the nozzle array of a printhead in the first embodiment will be described in comparison with the conventional method. The first embodiment will exemplify a case where the printhead is mounted in a printing apparatus while direction A is inclined by θ from reference direction Y at a predetermined mounting position, as shown in FIG. 4. In other words, the printhead is mounted in a printing apparatus while the nozzle array direction is inclined by θ from the print medium conveying direction. Note that direction X is a printhead scanning direction.

Figure 3:
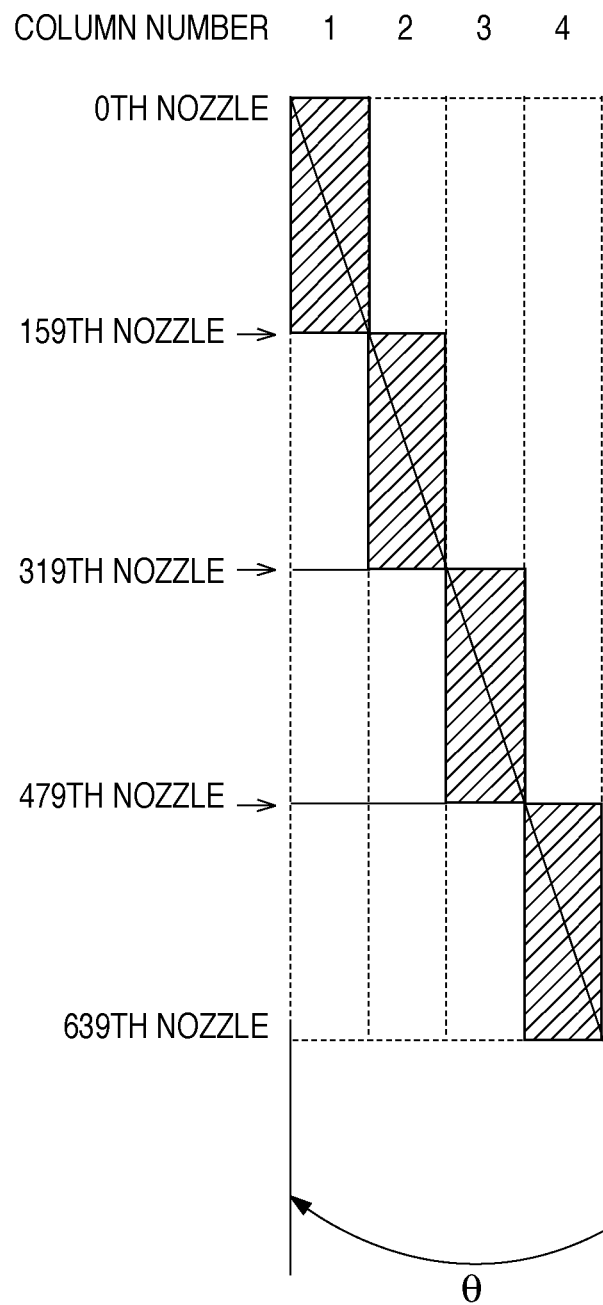
FIG. 3 is a view for explaining a printhead inclination correction method according to the present invention.

FIG. 3 is a view showing how to correct the inclination. In the printhead according to the first embodiment, one nozzle array has 640 nozzles. As shown in FIG. 3, based on the inclination θ of the printhead, 640 nozzles of one nozzle array are divided into four groups each including 160 adjacent nozzles. Print data used for the respective groups are shifted by one column each, i.e., a total of four columns in correspondence with the inclination θ of the printhead, thereby correcting the inclination θ of the printhead.

Figure 5:
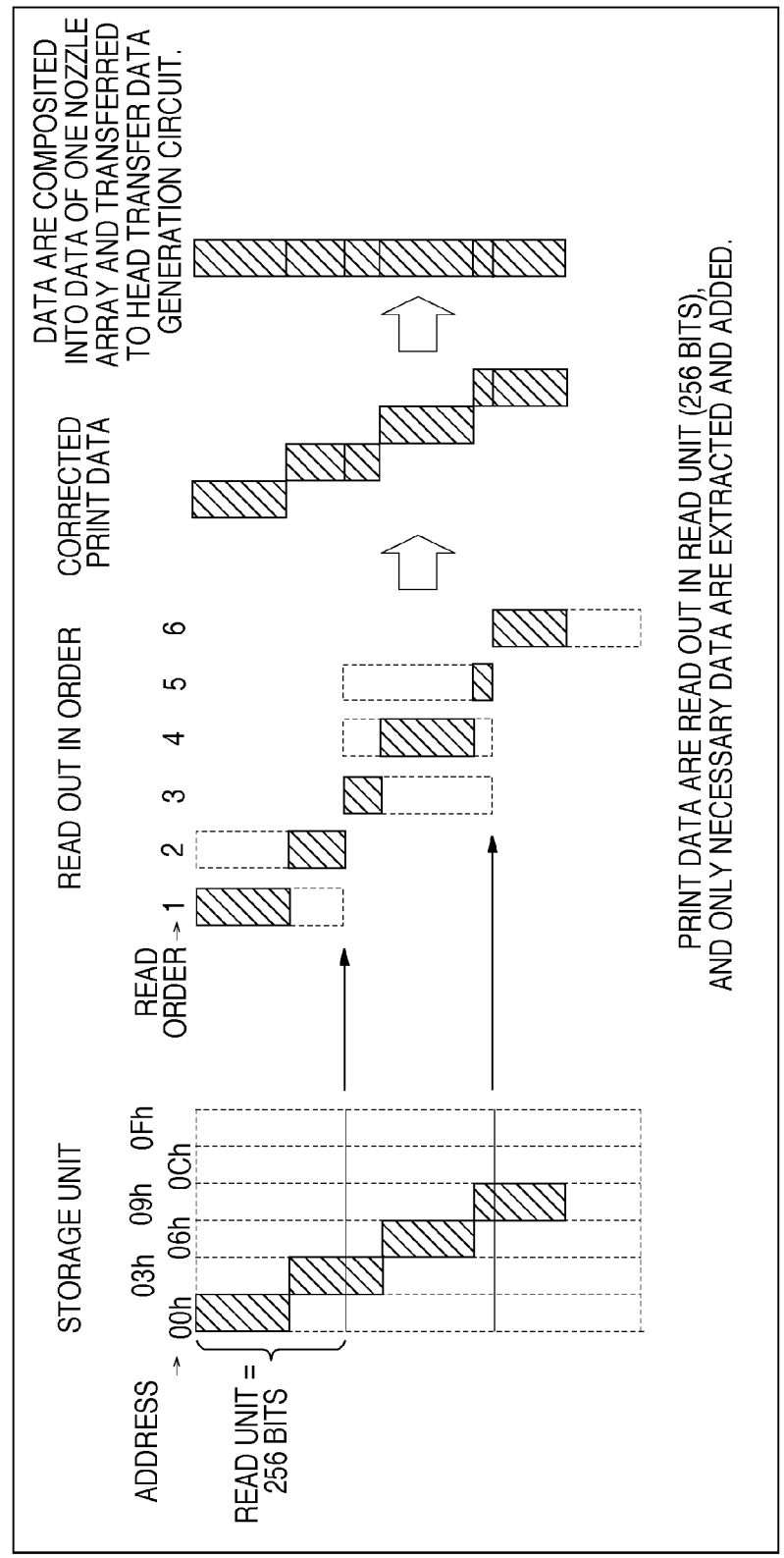
FIG. 5 is a view showing a conventional printhead inclination correction method.

FIG. 5 is a view showing a conventional printhead inclination correction method. In a conventional printing apparatus, a storage unit (corresponding to the first storage unit in the first embodiment) for storing print data and mask data is formed from a large-capacity RAM such as a DRAM. Such a storage unit can store large-capacity print data, but imposes restrictions on read and write. More specifically, the storage unit can process only 32 or 64 bits which are DRAM specifications, or when read and write are done by a burst operation in order to increase the read efficiency, only 128 or 256 bits which are a multiple of 32 or 64 bits. FIG. 5 shows a case where the unit of read from the storage unit is 256 bits. In this case, print data at addresses 00h and 03h for 0th to 255th nozzles, which correspond to print data for 256 nozzles, are read out. Then, print data at addresses 04h, 07h, and 0Ah for 256th to 511th nozzles, and print data at address 0Bh for 512th to 639th nozzles are read out. That is, six read operations are executed. Only necessary print data need be extracted from the readout print data, and added.

Figure 6:
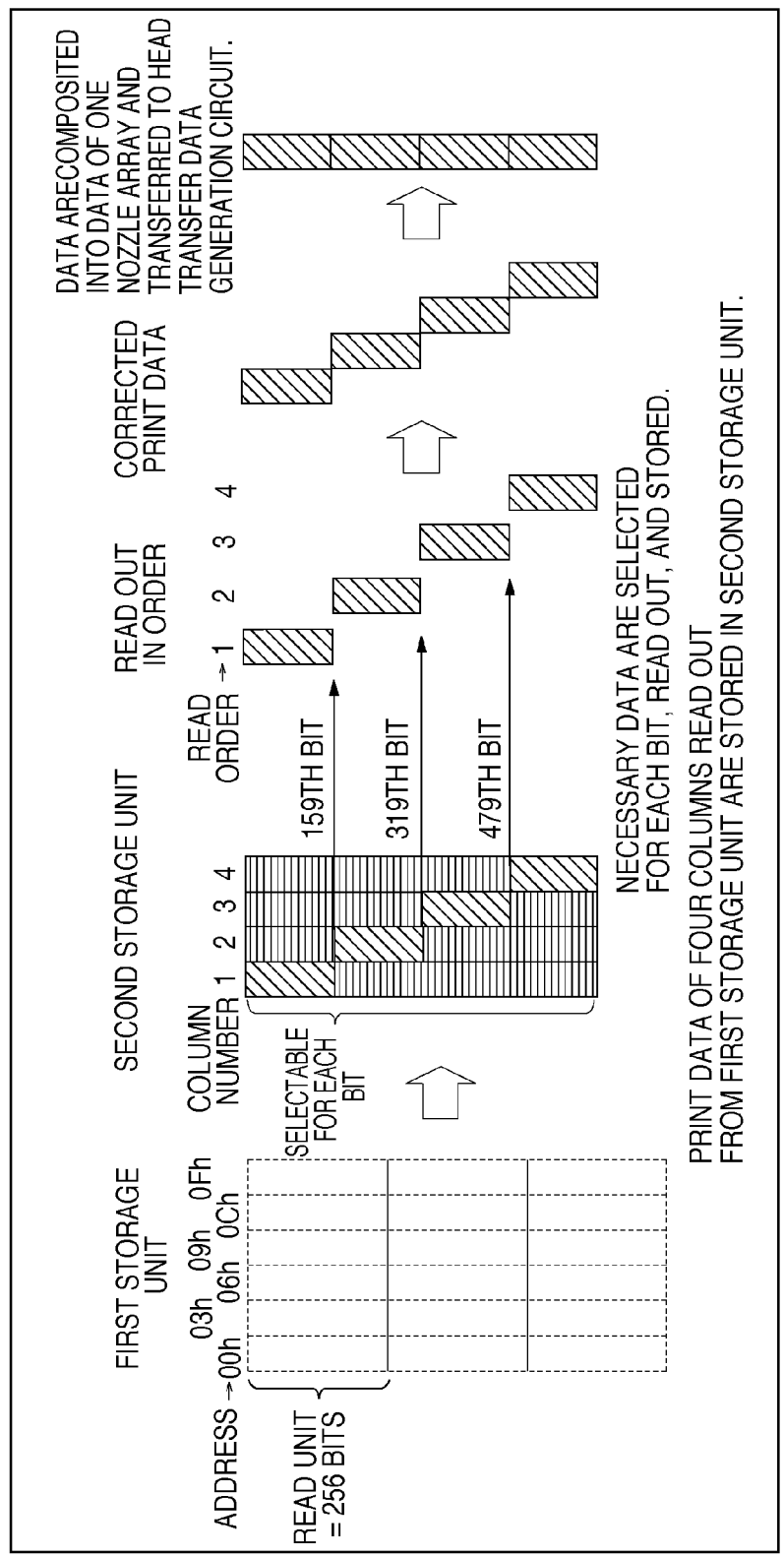
FIG. 6 is a view showing a printhead inclination correction method according to the present invention.

FIG. 6 is a view showing a printhead inclination correction method according to the first embodiment. Similar to the method of FIG. 5, print data stored in the first storage unit is read out for 256 bits in the nozzle array direction sequentially column by column. The readout print data is composited with mask data, and stored in the second storage unit. The second storage unit has an area for holding data of a plurality of columns in correspondence with respective nozzles. For example, in FIG. 6, the second storage unit has an area corresponding to four columns. Data of one column obtained by reading out print data of one column stored at the same column position in the first storage unit, and compositing it with mask data is stored at the same column position in the second storage unit. Every time access to data of one column is complete, the column position at which data is read out from the first storage unit is updated. At the same time, the column position at which data is stored in the second storage unit is updated. These update operations are controlled to circulate the column positions (column addresses) in both the first and second storage units. Reading from the first storage unit is done until all print data subjected to inclination correction is stored in the second storage unit. The second storage unit stores print data of four columns so that the respective bits of print data of the columns correspond to the respective nozzles of the printhead. Based on the inclination of the printhead, 640 nozzles are divided into four successive groups each including 160 adjacent nozzles, as shown in FIG. 3. In correspondence with this, print data of each column is divided into four groups.

As shown in FIG. 3, print data of four columns in the print medium conveying direction is used to correct the inclination of the printhead. When all successive print data of four columns is stored in the second storage unit, print data necessary for correction is read out from each column for each group. Since the second storage unit can input/output data for each bit, it can cope with even a case where the number of groups divided in correspondence with the inclination of the printhead and the number of nozzles belonging to a single group change.

Every time print data of one column is read out from the first storage unit, the second storage unit stores successive print data of four columns circularly for each column. Print data belonging to different groups is read out from the respective columns out of the successive print data of the four columns which are stored in the second storage unit. Print data is edited for the respective nozzles of the printhead, and printing is done based on the print data. This processing is repeated.

The small-capacity second storage unit is formed from a register or SRAM. Thus, writing in the second storage unit and reading from the second storage unit can be complete within a much shorter time than reading from the first storage unit formed from a DRAM. That is, these operation times do not delay correction of the printhead inclination.

Since the second storage unit is formed from a register or SRAM, data can be selected and read out for each bit. Although the number of read operations increases, the time taken for inclination correction does not become longer.

When all print data corresponding to one nozzle array are stored, print data read out from the second storage unit is composited and transmitted to the head transfer data generation circuit.

The second embodiment will exemplify a case where corrected print data of one nozzle array is divisionally printed while complemented by two nozzle arrays. A printing apparatus used in the second embodiment has two print modes: a high-speed mode in which printing is done by giving priority to the printing speed, and a high-quality mode in which printing is done by giving priority to the image quality. In the high-speed mode, printing is performed by copying print data read out once to obtain print data of two nozzle arrays. In the high-quality mode, printing is performed by reading out print data for each nozzle array.

Figure 7:
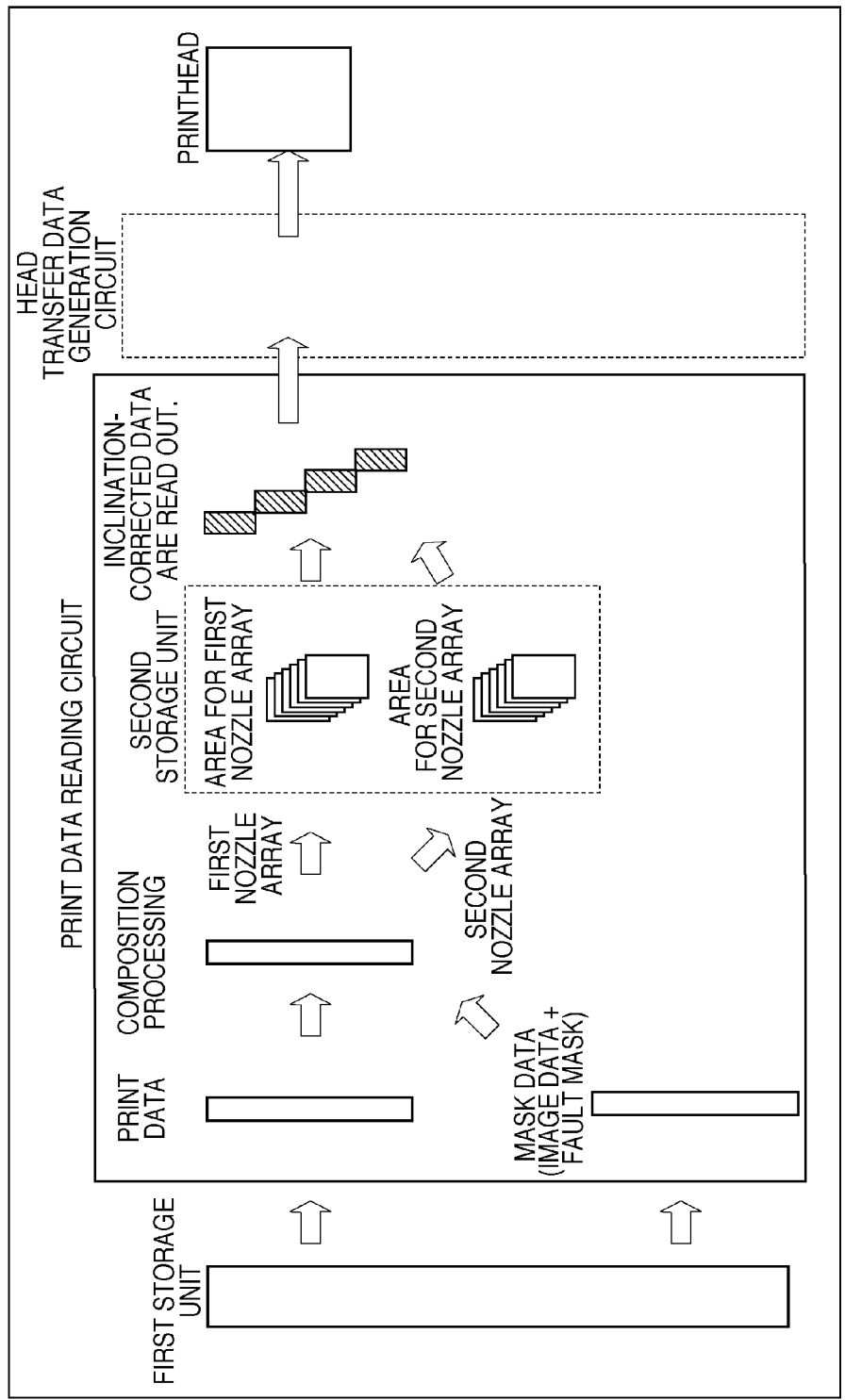
FIG. 7 is a view showing the sequence of print data processing in the high-quality mode.

FIG. 7 is a view showing the sequence of print data processing when executing the high-quality mode (image quality oriented mode). In the high-quality mode, the operating speed of the printing apparatus is decreased to accurately apply ink to a print medium. Thus, the processing time of the internal circuit of the printing apparatus has a margin. The first storage unit stores print data, image mask data, and fault mask data. There is enough time to read out and process these data for each nozzle array. In FIG. 7, print data and mask data (image mask data and fault mask data) of the first and second nozzle arrays are read out for the respective nozzle arrays. Print data and mask data are read out from the first storage unit for each nozzle array, and composition processing is executed to composite the print data with the mask data. The composited print data is stored in the second storage unit. Similar to the first embodiment, the print data is read out from the second storage unit to correct the inclination of the printhead. The corrected print data is transmitted to a head transfer data generation circuit.

Figure 8:
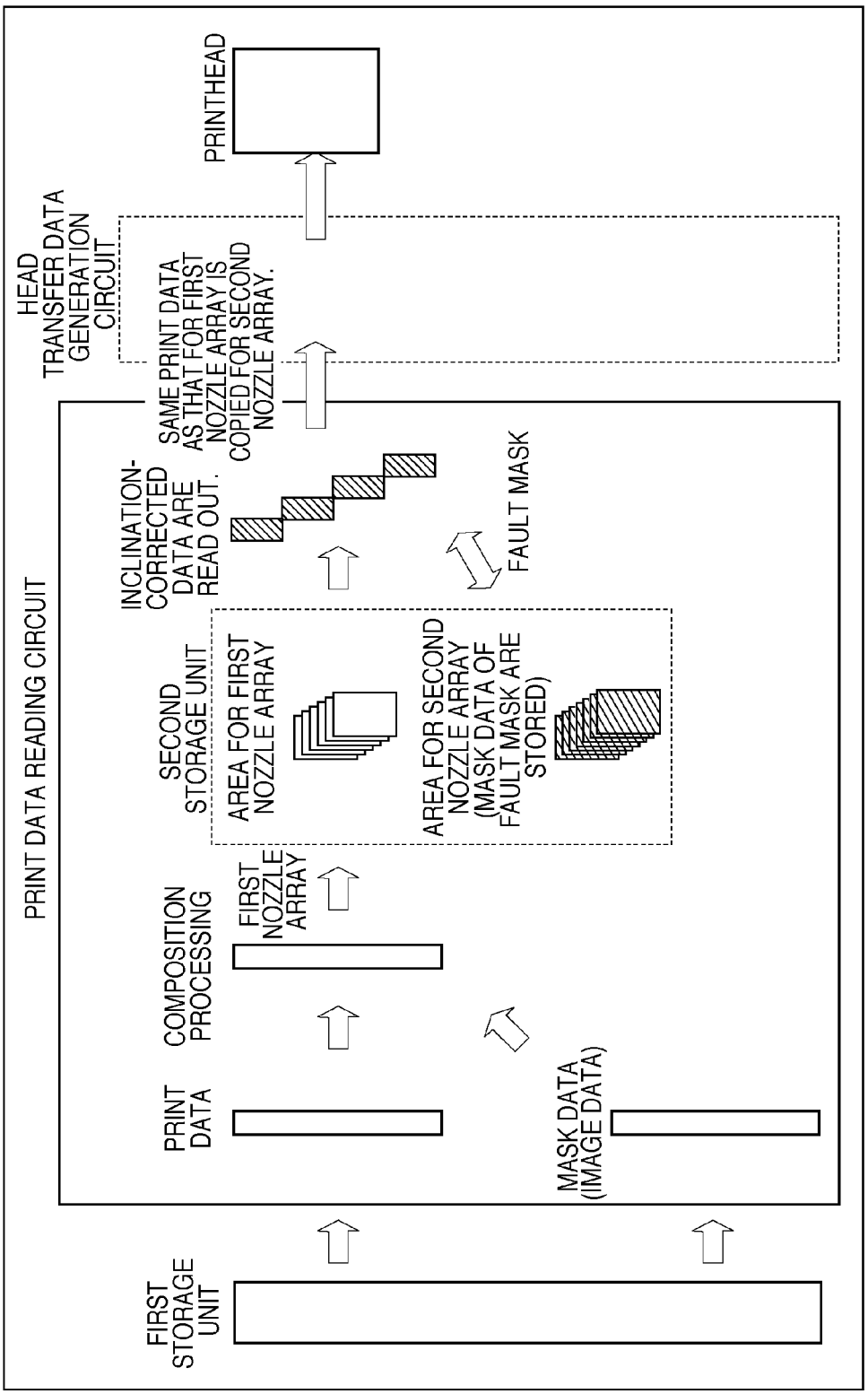
FIG. 8 is a view showing the sequence of print data processing in the high-speed mode.

FIG. 8 is a view showing the sequence of print data processing when executing the high-speed mode (speed oriented mode). In the high-speed mode, only print data and mask data formed from only image mask data, which are common to the first and second nozzle arrays, are read out from the first storage unit. Composition processing is performed to composite the print data with the mask data. The composited print data is stored in the second storage unit. This mode uses print data and mask data common to the first and second nozzle arrays, so half of the data storage area in the second storage unit is free. Thus, fault mask data, which is stored in the first storage unit and is different between nozzle arrays, is stored in advance in the free data storage area of the second storage unit. That is, the second storage unit holds fault mask data of the first nozzle array and that of the second nozzle array. Composited print data is read out from the second storage unit for each nozzle array. Before transferring the print data to the head transfer data generation circuit, mask data of the fault mask stored in the second storage unit is read out and composited with the print data. Then, the print data further composited with the mask data of the fault mask is transmitted to the head transfer data generation circuit. The number of mask data read operations from the first storage unit that take a long time to read out data can be reduced, increasing the printing speed.

FIG. 10 shows a circuit arrangement for executing processing. Data processes by a first storage unit 27 to a third storage unit are executed in order for each nozzle array. This is because the number of nozzles of one nozzle array is large and a large circuit size is required to simultaneously transfer data of a plurality of nozzle arrays.

Figure 11:
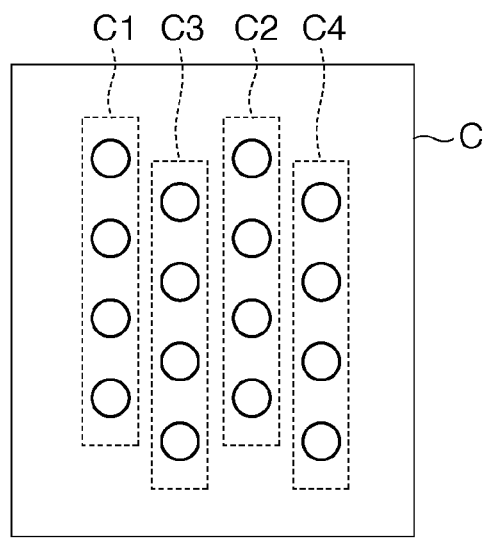
FIG. 11 is an explanatory view of the nozzle array of the printhead according to the present invention.

FIG. 11 is a view for explaining cyan head C as an example of a printhead shown in FIG. 10. Reference symbol C1 denotes a first odd nozzle array; C2, a second odd nozzle array; C3, a first even nozzle array; and C4, a second even nozzle array. For descriptive convenience, the number of nozzles of each nozzle array is four. Although not shown, this also applies to heads of other ink colors such as magenta and yellow. The nozzle array direction and nozzle array layout in FIG. 11 are the same as those in FIG. 4.

In FIG. 10, a print buffer 271 holds print data, an image mask buffer 272 holds image mask data, and a fault mask buffer 273 holds fault mask data.

The image mask data is used to, for example, decimate print data to prevent density nonuniformity of an image printed on a print medium when performing multipass printing to complete an image on a print medium by a plurality of scan print operations. For this purpose, image mask data is prepared for each nozzle array. The image mask data has a data structure in which the decimation pattern changes depending on the column position. As the image mask data, for example, data of 128 columns are prepared. Every time print data of one column is read out, one column is selected from the 128 columns and read out. The image mask data includes, as a table, information corresponding to the print mode and the number of scan operations.

Multipass printing completes an image by, e.g., two scan print operations in the high-speed mode and four scan print operations in the high-quality mode. However, the number of scan print operations is merely an example, and is not limited to these values.

The fault mask data is used to mask data so as not to use a discharge failure nozzle of a nozzle array in printing. The fault mask data is created based on discharge failure nozzle information. Although not described in detail, a discharge failure nozzle is detected to hold information relating to the discharge failure nozzle. The fault mask buffer 273 holds fault mask data based on the discharge failure nozzle information. The fault mask data is held in correspondence with each nozzle array. When the number of nozzles of one nozzle array is 640, fault mask data of the nozzle array is made up of 640 bits. This data amount equals the print data amount of one column or the image mask data amount of one column.

A print data reading circuit 24 includes a data changing unit (conversion unit) 241 and a memory control unit 242. As processing executed by the data reading circuit 24, for example, print data and image mask data are ANDed, and the result is further ANDed with fault mask data. The result is output to a head transfer data generation circuit 23. In this way, the print data reading circuit 24 changes information representing discharge into one representing non-discharge. The data changing unit 241 can also be referred to as a data decimation unit.

The data changing unit (conversion unit) 241 ANDs print data and mask data. For this purpose, the data changing unit 241 includes a buffer or register for holding print data and mask data. The memory control unit 242 performs storage (write) in buffers 251 to 254 and read from the buffers 251 to 254.

The memory control unit 242 has different control contents between the high-quality mode and the high-speed mode. In the high-quality mode, the memory control unit 242 reads out print data from the print buffer 271, image mask data from the image mask buffer 272, and fault mask data from the fault mask buffer 273. In the high-speed mode, the memory control unit 242 reads out print data from the print buffer 271, image mask data from the image mask buffer 272, and fault mask data from the second storage unit 25.

The second storage unit 25 includes the buffers 251 to 254 corresponding to nozzle arrays C1 to C4 of the printhead. As described with reference to FIG. 6, the second storage unit 25 has a 4-column area for one nozzle array.

In the high-quality mode, the buffer 251 holds odd nozzle data to be transferred to the first odd nozzle array C1. The buffer 252 holds odd nozzle data to be transferred to the second odd nozzle array C2. The buffer 253 holds even nozzle data to be transferred to the first even nozzle array C3. The buffer 254 holds even nozzle data to be transferred to the second even nozzle array C4.

In the high-speed mode, neither of the buffers 252 and 254 holds print data. In the buffers 252 and 254, 4-column areas become free. Before the print operation starts, fault mask data is stored in these free areas in advance. The data changing unit 241 ANDs print data and fault mask data.

Figure 12:
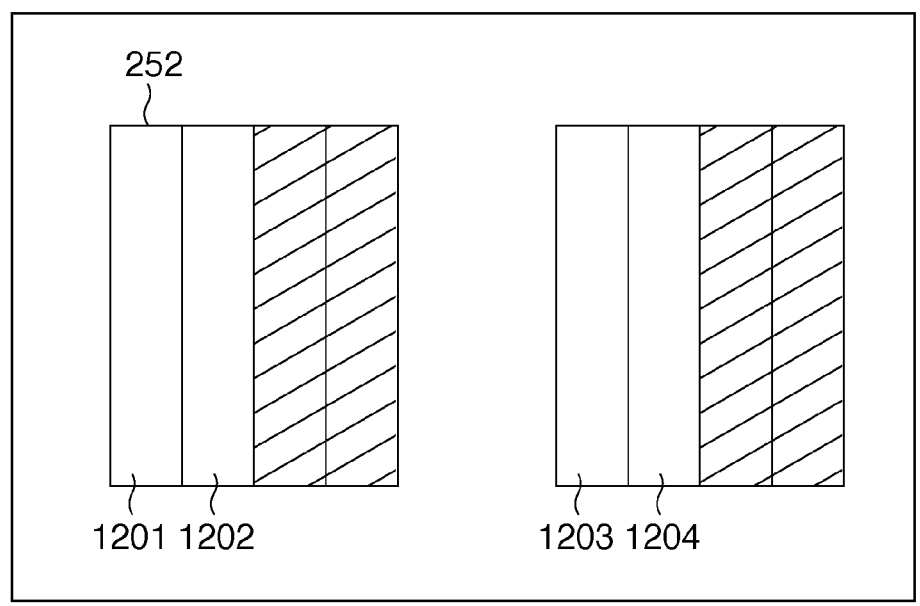
FIG. 12 is an explanatory view of the second storage unit according to the present invention.

The buffers 252 and 254 will be explained with reference to FIG. 12. For descriptive convenience, a description of the buffers 251 and 253 will be omitted. In the high-speed mode, the buffer 252 holds fault mask data 1201 of the first odd nozzle array and fault mask data 1202 of the second odd nozzle array. The remaining 2-column area of the buffer 252 is free. The buffer 254 holds fault mask data 1203 of the first even nozzle array and fault mask data 1204 of the second even nozzle array. The remaining 2-column area of the buffer 254 is free. The fault mask data 1201 to 1204 is read out from the fault mask buffer 273 when the print mode changes from the high-quality mode to the high-speed mode. The memory control unit 242 performs this processing.

The head transfer data generation circuit 23 includes a memory control unit 231, a transfer unit 232, and a third storage unit 233. The memory control unit 231 performs storage processing to read out data held in the data changing unit 241 and store it in the third storage unit 233, and processing to read out data stored in the third storage unit 233 and transfer it to the transfer unit 232.

The transfer unit 232 transfers data to a printhead 1. Data of a nozzle array is temporally parallel-transferred from the transfer unit 232 to the printhead 1. For descriptive convenience, FIG. 10 shows a nozzle array having nozzles for discharging cyan ink. Data held in a buffer 2331 is transferred to C1. Data held in a buffer 2332 is transferred to C2. Data held in a buffer 2333 is transferred to C3. Data held in a buffer 2334 is transferred to C4.

Figure 9:
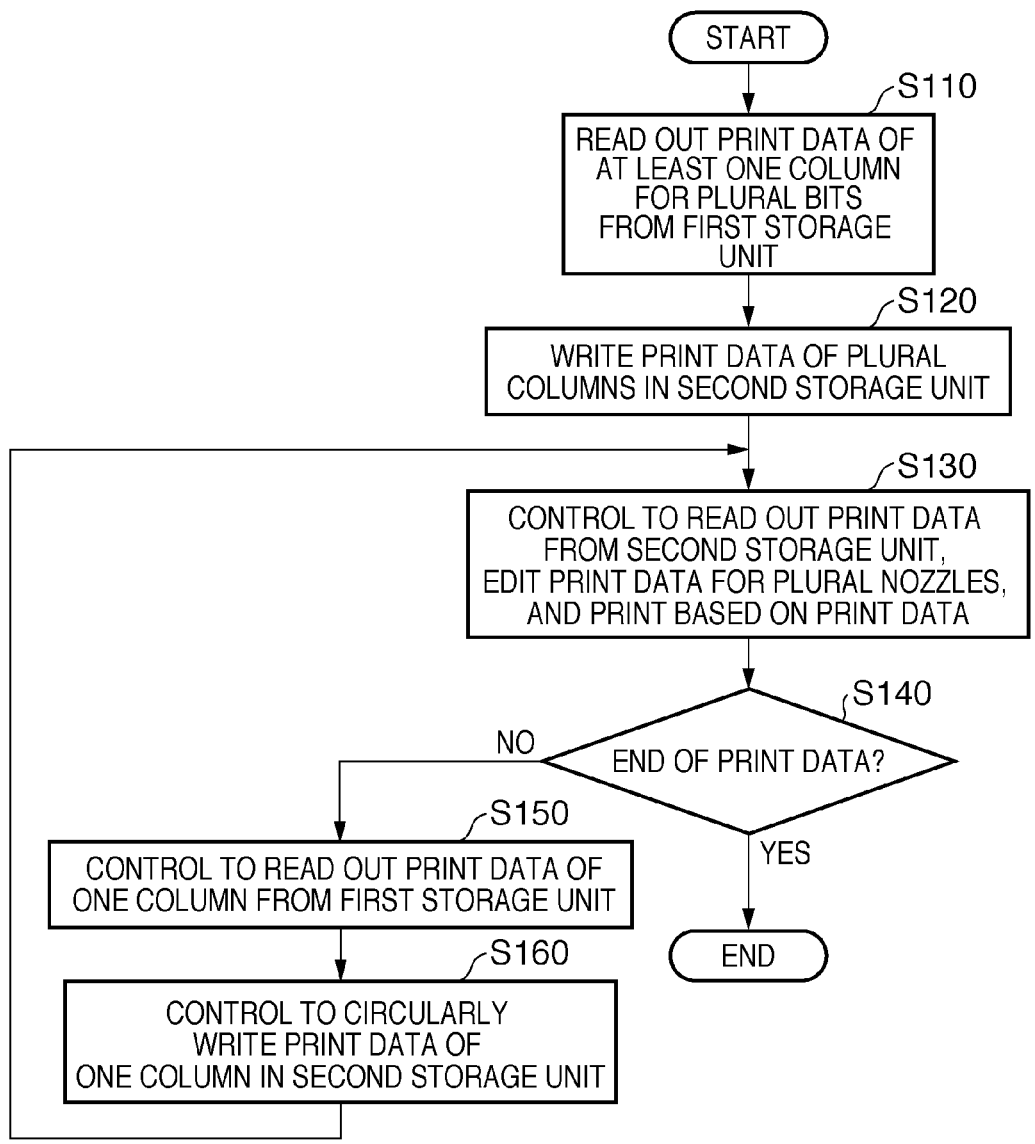
FIG. 9 is a flowchart exemplifying a printing method according to the present invention.

An example of a printing method of correcting the inclination of the nozzle array of the printhead and printing according to the present invention will be described with reference to the flowchart of FIG. 9. The processing in FIG. 9 is executed, e.g., every scanning. This processing is applied to the above-described embodiments.

In step S110, print data of at least one column in the print medium conveying direction is read out for a predetermined number of bits from print data stored in the first storage unit, which stores print data used for printing by at least one scanning of the printhead.

In step S120, print data of a plurality of columns read out in step S110 is written in the second storage unit. Note that the second storage unit is higher in data input/output speed than the first storage unit, and can input/output data for each bit. The second storage unit stores print data of a plurality of columns determined based on the inclination of the printhead so that the respective bits of print data of each column correspond to the respective nozzles of the printhead. Further, print data of each column is divided into a plurality of groups in correspondence with division of a plurality of nozzles into a plurality of successive groups based on the inclination.

In step S130, it is controlled to read out print data belonging to different groups from a plurality of columns of the second storage unit, edit print data for a plurality of nozzles, and print based on the edited print data.

In step S140, it is determined whether print data has ended. If the print data has ended, the processing to correct the inclination of the nozzle array of the printhead and print ends. If no print data has ended, the process advances to step S150. In step S150, it is controlled to read out print data of the next column in the printhead scanning direction from print data stored in the first storage unit. In step S160, it is controlled to circularly write the print data read out in step S150 in the second storage unit for each column. Then, the process returns to step S130. Until the print data has ended, steps S150, S160, and S130 are repeated based on step S140.

The present invention can correct, without decreasing the printing speed, a print position error caused by the inclination of the nozzle array of a printhead owing to an error generated when manufacturing a printhead, or a mounting error generated when mounting a printhead in a printing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-311480 filed on Nov. 30, 2007, which is hereby incorporated by reference herein in its entirety.

What is claimed is:

1. A printing apparatus comprising:
    a printhead having, for each color ink, a plurality of nozzle arrays in each of which a plurality of nozzles are arrayed;
    a scanning unit configured to scan the printhead;
    a control unit configured to execute a speed oriented mode and an image quality oriented mode as modes of the scanning unit;
    a print control unit configured to generate data to be transferred to the printhead, for each nozzle array, based on print data, based on decimation data to decimate the print data, and based on information relating to an inclination of a nozzle array in a reference direction; and
    a memory control unit configured to read out print data held in a first buffer memory outside the print control unit, and to store, in a second buffer memory inside the print control unit in correspondence with a nozzle array, print data decimated in accordance with the decimation data,
    wherein in the image quality oriented mode, the print control unit reads out the decimation data from the first buffer memory and generates data to be transferred to the printhead, and
    wherein in the speed oriented mode, the print control unit reads out the decimation data held in advance in the second buffer memory and generates data to be transferred to the printhead.

2. The apparatus according to claim 1, wherein the first buffer memory is a DRAM.

3. The apparatus according to claim 1, wherein the second buffer memory is an SRAM or a register.

4. The apparatus according to claim 1, wherein the print control unit comprises:
    a data decimation unit configured to decimate, by using the decimation data, print data read out from the first buffer memory; and
    a memory control unit configured to write, in the second buffer memory, data decimated by the data decimation unit.

5. The apparatus according to claim 1, wherein the print control unit comprises a third buffer memory configured to hold, for each nozzle array, data generated based on the information relating to the inclination of the nozzle array in the reference direction.

6. The apparatus according to claim 1, wherein the second buffer memory has an area for holding data of a plurality of columns for each nozzle array.

7. The apparatus according to claim 1,
    wherein in the image quality oriented mode, the print control unit generates, based on print data different between nozzle arrays, data to be transferred to the printhead, and
    wherein in the speed oriented mode, the print control unit generates, based on print data of one nozzle array, data to be transferred to the printhead for a plurality of nozzle arrays.

8. A printing method of performing scan printing on a print medium by using a printhead having, for each color ink, a plurality of nozzle arrays in each of which a plurality of nozzles are arrayed, the method comprising:
    setting execution selection between of a speed oriented mode and an image quality oriented mode as a mode of the scan printing;
    generating, by a print control unit, data to be transferred to the printhead for each nozzle array based on print data of one nozzle array, decimation data to decimate data corresponding to a nozzle which does not discharge ink in the print data of the one nozzle array, and information relating to an inclination of a nozzle array in a reference direction;
    reading out print data held in a first buffer memory outside the print control unit; and storing in a second buffer memory inside the print control unit print data decimated in accordance with the decimation data, wherein in the generating step, when executing the image quality oriented mode, the decimation data is read out from the first buffer memory to generate data to be transferred to the printhead, and wherein when executing the speed oriented mode, the decimation data held in advance in the second buffer memory is read out to generate data to be transferred to the printhead.

\* \* \* \* \*